Aug. 20, 1929.   R. GLENDINNING   1,725,265
BEVERAGE MIXING AND SERVING SET
Filed Aug. 21, 1924
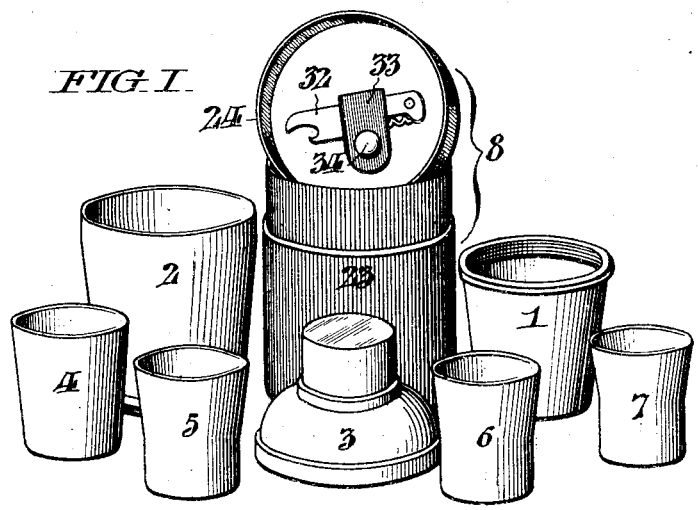
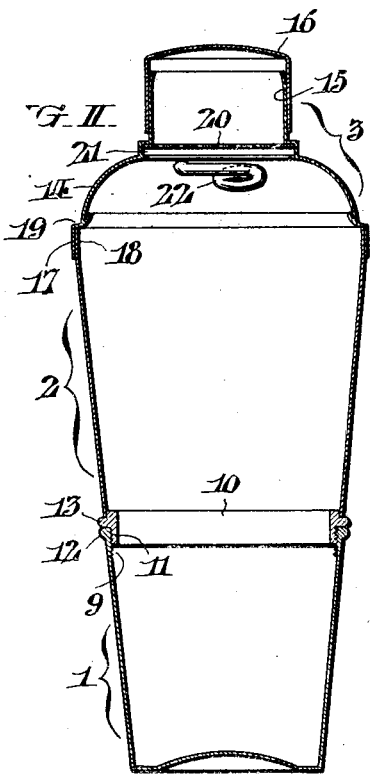
WITNESSES:
James H. Bell
Alfred E. Schinger
INVENTOR:
Robert Glendinning,
BY Tracey Paul
ATTORNEYS.

Patented Aug. 20, 1929.

1,725,265

UNITED STATES PATENT OFFICE.

ROBERT GLENDINNING, OF CHESTNUT HILL, PENNSYLVANIA.

BEVERAGE MIXING AND SERVING SET.

Application filed August 21, 1924. Serial No. 733,319.

This invention relates to beverage mixing and serving sets, and has for its object the provision of an outfit of this sort which is complete with shaker, drinking cups, etc., and capable of being assembled into compact form when not in use, so that it may be conveniently carried in trunks, suit cases, or hand bags.

In the drawings, Fig. I is a perspective view showing the various parts of my improved beverage mixing set removed from the carrier case provided to receive them when not in use.

Fig. II is a sectional view of the shaker assembled and ready for use; and

Fig. III is a sectional elevation showing the constituent parts of the outfit packed within the carrier case.

As shown in Fig. I, the mixing and serving set includes the metallic parts 1, 2, 3, which, when assembled as in Fig. II, constitute the shaker; a multiplicity or nest of cups 4, 5, 6, 7, also preferably metallic; and a carrier casing 8 to receive the various parts. The parts 2, 1, 4, 5, 6, 7 are all substantially conical and of successively diminishing sizes, so that they may be internested as hereinafter explained.

As shown in Fig. II, the part 1 serves as the lower body section of the shaker, being internally threaded at the top as indicated at 9. The part 2 constitutes the companion body section of the shaker, having at the lower end a flange 10 with an exteriorly threaded extension 11 to engage the internal thread 9 of the section 1. When the parts 1—2 are assembled, the exterior surface of the shaker body is flush and continuous except for the ornamental beads 12, 13 at opposite sides of the line of juncture. The part 3 which forms the shaker cover is shown domed as at 14 and formed with a coaxial neck 15, which is of reduced diameter and designed to serve as a pouring spout. A removable cap 16 is provided as a closure for the neck 15, to prevent spilling of the contents of the shaker during mixing. The rim 17 of the cover member 3 is of a diameter to engage over the corresponding cylindrical brim 18 of the upper body section 2 of the shaker with a comparatively tight fit, to insure against leakage at their junction. The extent of this overlap between the parts 2 and 3 is determined by a shouldered offset 19 of the latter. A strainer 20 of foraminated sheet metal is secured in a recess 21 of the cover member 3, to retain any solid matter when the mixed beverage is poured from the shaker. The latter operation is facilitated by provision of a vent tube 22, which is shown coiled to safe-guard against loss of any of the contents of the shaker during mixing.

The carrier casing 8, shown to the best advantage in Fig. III, embodies a main or base member 23, and a cover or lid 24 which fits oves the reduced upper end 25 of the part 23 against a stop shoulder 26. These casing parts 23—24 may be constructed from any suitable material, such as card board or wood fashioned or built up to the cross-sectional configuration shown. The bottom 27 of the base member 23 of the casing 8 is shown quite thick to afford rigidity, and is centrally recessed as at 28 for a purpose to be presently explained. The top 29 of the casing cover or lid 24 is also shown quite heavy as shown for a similar reason. In practice, the casing 8 is surfaced exteriorly with either leather or cloth, as conventionally indicated in Fig. I, and interiorly finished with a lining 30 of pile texture, preferably plush.

In packing, the shaker is disassembled, the body section 1 inserted in the section 2, and the inter-nested group, introduced into the main or base member 23 of the casing 8 as shown in Fig. III. As here shown, the rim 18 of the part 2 fits snugly within the casing, while the threaded extension at its lower end seats in the recess 28 of the casing bottom 27, with the circumferential bead 13 resting on the marginal ledge surrounding said recess. Accordingly, the part 2 is not only centralized in the base member 23 of the casing, but held against movement therein. The nest of cups 4—5—6—7 is next inserted within the shaker body group 1—2, as also shown in Fig. III. The shaker cover member 3 is then inverted and placed in the upper end of the (higher) body section 2, over the nest of cups 4—5—6—7, with its spout or neck 15 in the innermost cup 7. As here shown, the cover shoulder 19 rests on the upper edge of the section 2,—the casing part 23 being circumferentially recessed somewhat as shown to allow for the slightly larger diameter of the rim 17. When the shaker cover 3 is thus placed, its domed portion 14 is accommodated in the open top of the part 2 and its neck 15 extends downwardly into the innermost cup 7 as above indicated. As shown, the cap 16 engages said cup 7 to hold the cup group against displacement. Sticking or binding between the cups is prevented by the diversified flaring about the mouths of the inner ones 5—6—7, as shown; so that they may be readily disassociated for use. The outermost cup 4 is made slightly smaller in diameter than the lower shaker section 1 so that the nest of cups is snugly accommodated within the shaker sections and the cups are thus safely held against undue movement or rattling.

If desired, the set may be supplemented with a combined bottle opener and cork screw shown at 32 in Figs. I and III, which may be stowed and retained inside the lid 24 by a strap 33 with a snap button 34.

Having thus described my invention, I claim:—

1. A beverage mixing and serving set comprising a shaker cover section; a nest of drinking cups; and separable lower and upper shaker body sections nesting the former within the latter; the inner one of these nested body sections accommodating the nested cups within it, and one of said sections extending above the other and receiving the cover inverted over the cups.

2. A beverage mixing and serving set comprising a shaker cover section with a pouring spout, a nest of drinking cups accommodating said spout within them, and separable shaker body sections nesting one within another and receiving the nested cups and the cover, with its spout in the latter.

In testimony whereof, I have hereunto signed my name at Philadelphia, Pennsylvania, this 18th day of August, 1924.

ROBERT GLENDINNING.